United States Patent
Petzen, III et al.

(10) Patent No.: US 10,323,547 B2
(45) Date of Patent: Jun. 18, 2019

(54) STEAM DRUM LEVEL CONTROL SYSTEM, COMPUTER PROGRAM PRODUCT AND RELATED METHODS

(71) Applicant: General Electric Company, Schenectady, NY (US)

(72) Inventors: John Alexander Petzen, III, Roanoke, VA (US); Bryan George Carter, Stone Mountain, GA (US); Awadesh Kumar Tiwari, Bangalore (IN)

(73) Assignee: GENERAL ELECTRIC COMPANY, Schenectady, NY (US)

(*) Notice: Subject to any disclaimer, the term of this patent is extended or adjusted under 35 U.S.C. 154(b) by 439 days.

(21) Appl. No.: 15/051,046

(22) Filed: Feb. 23, 2016

(65) Prior Publication Data
US 2017/0241298 A1    Aug. 24, 2017

(51) Int. Cl.
| F02C 6/18 | (2006.01) |
|---|---|
| F01K 23/10 | (2006.01) |
| F22D 5/28 | (2006.01) |
| F22D 5/30 | (2006.01) |
| F22D 5/34 | (2006.01) |

(52) U.S. Cl.
CPC .......... *F01K 23/101* (2013.01); *F01K 23/108* (2013.01); *F22D 5/28* (2013.01); *F22D 5/30* (2013.01); *F22D 5/34* (2013.01); *Y02E 20/16* (2013.01)

(58) Field of Classification Search
CPC ...... F01K 23/10; F01K 23/101; F01K 23/108; F22D 5/28; F22D 5/30; F22B 1/1815; Y02E 20/16; F02C 6/18; F05D 2220/72
See application file for complete search history.

(56) References Cited

U.S. PATENT DOCUMENTS

| 4,031,404 A | 6/1977 | Martz et al. | |
|---|---|---|---|
| 4,069,675 A | 1/1978 | Adler et al. | |
| 4,174,618 A * | 11/1979 | Jenkins, Jr. | F01K 3/22 60/664 |
| 4,242,989 A * | 1/1981 | Chamberlain | G05D 9/12 122/451 R |
| 4,353,204 A * | 10/1982 | Arakawa | F01K 9/00 122/7 R |

(Continued)

FOREIGN PATENT DOCUMENTS

| JP | 2006046874 A | 2/2006 |
|---|---|---|
| JP | 2007170814 A | 7/2007 |
| WO | 2010126433 A1 | 11/2010 |

*Primary Examiner* — William H Rodriguez
(74) *Attorney, Agent, or Firm* — Ernest G. Cusick; Hoffman Warnick LLC (57) ABSTRACT

Various embodiments include a system having: at least one computing device configured to perform actions including: measuring at least one of the following parameters: a steam pressure within a steam drum, a load on a GT, a position of a bypass valve bypassing an HRSG, and a steam flow rate through the steam drum; defining a threshold range for each of: a steam pressure within the steam drum, a load on the GT, a position of the bypass valve bypassing the HRSG and a steam flow rate through the steam drum based upon the measured data and a target steam level; and adjusting the steam flow rate through the steam drum in response to at least one of the measured parameters deviating from the corresponding threshold range.

15 Claims, 3 Drawing Sheets

(56) References Cited

U.S. PATENT DOCUMENTS

| | | | |
|---|---|---|---|
| 4,437,313 A | 3/1984 | Taber et al. | |
| 4,497,283 A * | 2/1985 | LaSpisa | F22D 5/26 122/414 |
| 4,573,323 A * | 3/1986 | Mock | F01K 3/185 122/406.3 |
| 4,802,446 A * | 2/1989 | Triggs | F22B 35/02 122/448.4 |
| 5,148,775 A | 9/1992 | Peet | |
| 5,419,285 A * | 5/1995 | Gurevich | F22D 1/04 122/406.1 |
| 5,771,846 A | 6/1998 | Ruchti | |
| 6,237,542 B1 * | 5/2001 | Nakajo | F22B 1/1815 122/420 |
| 6,412,285 B1 | 7/2002 | Ranasinghe et al. | |
| 6,851,265 B2 * | 2/2005 | Elwood | F02C 6/18 122/7 B |
| 7,017,407 B1 | 3/2006 | Hatfield et al. | |
| 7,385,300 B2 | 6/2008 | Huff et al. | |
| 7,603,185 B2 | 10/2009 | Stewart et al. | |
| 8,397,679 B2 * | 3/2013 | Kozaki | F22B 37/261 122/488 |
| 8,463,445 B2 | 6/2013 | Kumar et al. | |
| 8,757,105 B2 | 6/2014 | Kumar et al. | |
| 8,813,471 B2 | 8/2014 | Gulen et al. | |
| 8,887,747 B2 | 11/2014 | Kumar et al. | |
| 2005/0178759 A1 * | 8/2005 | Arora | F01K 23/101 219/490 |
| 2009/0159018 A1 * | 6/2009 | Mehendale | F01K 23/101 122/451 R |
| 2010/0126433 A1 * | 5/2010 | Kozaki | F22B 37/261 122/451 R |
| 2010/0139392 A1 * | 6/2010 | Kumar | F22B 35/00 73/290 R |
| 2011/0295432 A1 * | 12/2011 | Kumar | F22B 1/1815 700/281 |
| 2013/0319536 A1 | 12/2013 | Kumar et al. | |
| 2014/0331683 A1 * | 11/2014 | Mazzaro | F02C 6/18 60/772 |
| 2015/0090202 A1 | 4/2015 | Nenmeni et al. | |
| 2015/0167961 A1 * | 6/2015 | Tiwari | F22D 5/30 137/11 |

* cited by examiner

STEAM DRUM LEVEL CONTROL SYSTEM, COMPUTER PROGRAM PRODUCT AND RELATED METHODS

FIELD OF THE INVENTION

The subject matter disclosed herein relates to power systems. More particularly, the subject matter disclosed herein relates to controlling variation in steam drum levels in a power system.

BACKGROUND OF THE INVENTION

Generally, the combined cycle power plant includes gas turbines, steam turbines and the heat recovery steam generator (HRSG) systems. The HRSG systems are used for recovering heat in exhaust gases from the gas turbine and then using the recovered heat to produce and supply steam to the steam turbine. In general, the combined cycle power plant includes various kinds of water reservoirs such as boiler drum, deaerator reservoir and condenser reservoir. Normally, the boiler drum provides a stable water supply to the HRSG system and accumulates heat energy for compensating for changes in the amount of steam generated or consumed in the power plant. The boiler drum water level control may be significant for both plant protection and equipment safety, and can apply to high and low levels of water within the boiler drum. Additionally, a water vapor separator is especially provided inside the boiler drum so that wet steam may not be introduced into the steam turbine. Maintaining the boiler drum water level within limits is significant, as exceedance will often lead to trips or damage the equipment used in the HRSG system.

Conventional approaches for controlling the level of steam in the steam drum rely upon detecting and reacting to changes in drum level, and the balance of mass flow into, and out of, the boiler. However, these approaches are ineffective at controlling parameters for boiler swell and water level trips, causing the boiler to react too slowly to changes in demand at the steam turbine.

BRIEF DESCRIPTION OF THE INVENTION

Various embodiments of the disclosure include a system having: at least one computing device configured to perform actions including: measuring at least one of: a steam pressure within a steam drum, a load on a GT, a position of a bypass valve bypassing an HRSG, and a steam flow rate through the steam drum; defining a threshold range for each of: a steam pressure within the steam drum, a load on the GT, a position of the bypass valve bypassing the HRSG and a steam flow rate through the steam drum based upon the measured data and a target steam level; and adjusting the steam flow rate through the steam drum in response to at least one of the measured parameters deviating from the corresponding threshold range.

A first aspect of the disclosure includes a system having: at least one computing device configured to control a power plant system including a steam turbine (ST), a gas turbine (GT), and a heat recovery steam generator (HRSG) having a steam drum fluidly connected with the ST and the GT, by performing actions including: measuring: a steam pressure within the steam drum, a load on the GT, a position of a bypass valve bypassing the HRSG, and a steam flow rate through the steam drum; defining a threshold range for each of: a steam pressure within the steam drum, a load on the GT, a position of the bypass valve bypassing the HRSG and a steam flow rate through the steam drum based upon the measured data and a target steam level; and adjusting the steam flow rate through the steam drum in response to at least one of the steam pressure within the steam drum, the load on the GT, the position of the bypass valve bypassing the HRSG or the steam flow rate through the steam drum deviating from the corresponding threshold range A second aspect of the disclosure includes a system having: a steam turbine (ST); a gas turbine (GT); a heat recovery steam generator (HRSG) having a steam drum and being fluidly connected with the ST and the GT; and a control system coupled with the ST, the GT and the HRSG, the control system configured to control a flow of steam through the steam drum by performing actions including: measuring: a steam pressure within the steam drum, a load on the GT, a position of a bypass valve bypassing the HRSG, and a steam flow rate through the steam drum; defining a threshold range for each of: a steam pressure within the steam drum, a load on the GT, a position of the bypass valve bypassing the HRSG and a steam flow rate through the steam drum based upon the measured data and a target steam level; and adjusting the steam flow rate through the steam drum in response to at least one of the steam pressure within the steam drum, the load on the GT, the position of the bypass valve bypassing the HRSG or the steam flow rate through the steam drum deviating from the corresponding threshold range.

A third aspect of the disclosure includes a computer program product having program code, which when executed by at least one computing device, causes the at least one computing device to control a power plant system including a steam turbine (ST), a gas turbine (GT), and a heat recovery steam generator (HRSG) having a steam drum fluidly connected with the ST and the GT, by performing actions including: measuring: a steam pressure within the steam drum, a load on the GT, a position of a bypass valve bypassing the HRSG, and a steam flow rate through the steam drum; defining a threshold range for each of: a steam pressure within the steam drum, a load on the GT, a position of the bypass valve bypassing the HRSG and a steam flow rate through the steam drum based upon the measured data and a target steam level; and adjusting the steam flow rate through the steam drum in response to at least one of the steam pressure within the steam drum, the load on the GT, the position of the bypass valve bypassing the HRSG or the steam flow rate through the steam drum deviating from the corresponding threshold range.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the subject matter disclosed herein relates to power systems. More particularly, the subject matter disclosed herein relates to controlling variation in steam drum levels in a power system.

As noted herein, conventional approaches for controlling the level of steam in the steam drum rely upon detecting and reacting to changes in drum level, and the balance of mass flow into, and out of, the boiler. For example, if the boiler is operated at low loads and pressures (e.g., during startup of the power system), there is typically sufficient water mass in the drum such that a swell event (swelling of the boiler) will cause a high-level drum trip event without adding any feedwater to the boiler. The designed Normal Water Level (NWL) for a boiler is intended to maintain a minimum water inventory in the steam drum to allow a feedwater pump trip event, and subsequent recovery, without a low-level trip event. Feedwater pumps in power plants are large machines and may take more than 30 seconds to start, come up to speed and pressure, and start delivering feedwater to the steam drum in the boiler. If a running feedwater pump trips, the water inventory in the drum is used to support continued operation of the boiler until the redundant feedwater pump is able to supply the feedwater demand. Because steam drums are large, high-strength pressure vessels, volume inside the drum is minimized to reduce costs. The NWL is typically designated as high as possible (in the steam drum) to give the required water inventory for the system to ride through a feedwater pump trip. However, utilizing this setpoint-based approach at low flow rates and pressures leaves insufficient operating volume to accommodate some swell events in the boiler, particularly given that most trips occur due to high-level trip events.

In contrast to conventional approaches, various embodiments of the disclosure include controlling a drum level setpoint to anticipate a direction and magnitude of expected steam flow transients. The controlled setpoint accounts for a minimum water inventory required in the steam drum in order to prevent a low-level trip event (and corresponding system shutdown). In various embodiments, the minimum water inventory takes into account the possibility of a trip at the feedwater pump and engagement of a backup feedwater pump in order to avoid the low-level trip event. According to particular embodiments of the disclosure, systems, computer program products and methods can be employed in the field to determine a boiler setpoint based upon empirical data. In some cases, aspects of the disclosure include using empirical data (e.g., measured or otherwise obtained) in combination with a pre-defined model for the boiler (e.g., based upon the type of boiler and corresponding power system). In various embodiments, the obtained empirical data includes a measurement of at least one of: drum pressure, gas turbine load (in a combined-cycle system), a position of a steam bypass valve, or a steam flow rate.

In the following description, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be utilized and that changes may be made without departing from the scope of the present teachings.

Figure 1:
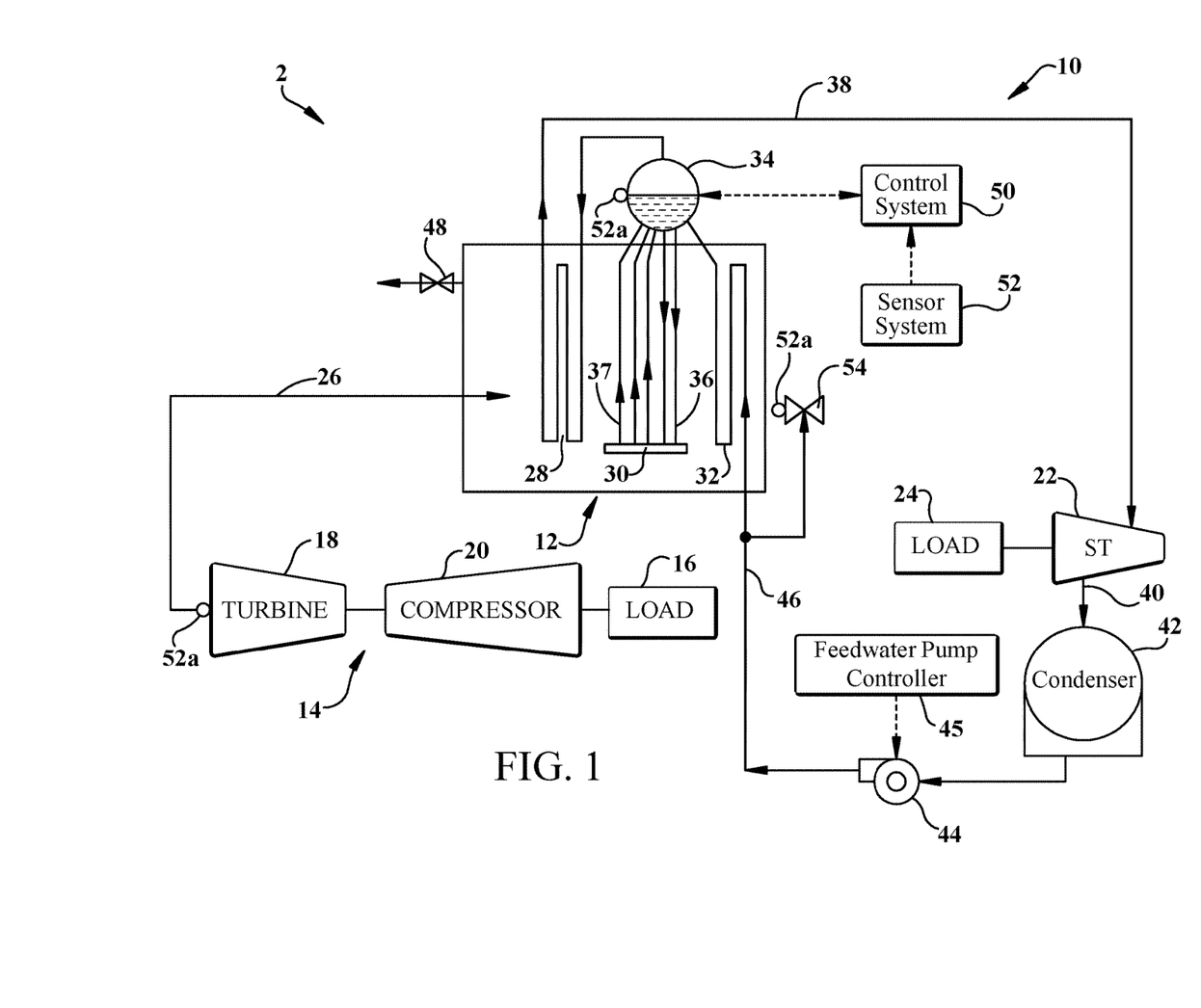
FIG. 1 shows a schematic depiction of a power plant system according to various embodiments of the disclosure.

FIG. 1 is a schematic system diagram of an embodiment of a system 2 including a combined cycle power generation system (system) 10 and a boiler drum water level control system (or, steam drum level control system) 50 connected with system 10. System 10 can include a heat recovery steam generator (HRSG) system 12, according to various embodiments of the disclosure. System 10 includes a gas turbine 14 for driving a first load 16 (e.g., a dynamoelectric machine such as a generator). Gas turbine 14 can include a turbine (section) 18 and a compressor (section) 20. System 10 also includes a steam turbine 22 for driving a second load 24 (e.g., a dynamoelectric machine such as a generator). In various embodiments, the first load 16 and/or the second load 24 includes an electrical generator for generating electrical power. In another embodiment, the first load 16 and the second load 24 includes other types of loads capable of being driven by the gas turbine 14 and steam turbine 22 (e.g., motor, pump, etc.). In addition, gas turbine 14 and steam turbine 22 may also be utilized in tandem to drive a single load via a single shaft, as is known in the art. In various embodiments, steam turbine 22 includes a low-pressure stage, an intermediate-pressure stage, and/or a high-pressure stage, as is known in the art. However, the specific configuration of steam turbine 22, as well as gas turbine 14, may be implementation-specific and may include any combination of stages.

As illustrated in FIG. 1, combined cycle power generation system 10 includes a multi-stage heat recovery steam generator (HRSG) system 12. HRSG system 12 is a simplified depiction of a general operation and is not intended to be limiting. HRSG system 12 receives hot exhaust gases 26 from gas turbine 14 for heating water and steam. HRSG system 12, aside from a duct through which the hot exhaust gases 26 pass, in its basic form, includes three additional components: a superheater 28, an evaporator 30, and an economizer 32 (or feedwater heater) arranged in an order with respect to the flow of exhaust gases 26 in the duct, as is known in the art. HRSG system 12 includes multiple downcomer tubes 36 and multiple evaporator tubes 37. Economiser 32 and the superheater 28 also include multiple tubes for water or steam flow in the HRSG system 12. Further, HRSG system 12 includes a boiler drum 34. The function of boiler drum 34 is to provide a stable amount of water to the evaporator 30 through the multiple downcomer tubes 36, and also to accumulate heat energy for compensating the changes in steam generated or consumed in system 10. Steam generated in HRSG system 12 can be supplied to steam turbine 22 through a line 38. Where load 24 is a generator, it may be coupled to steam turbine 22 for generation of electricity.

As shown in FIG. 1, exhaust 40 from steam turbine 22 is directed to a condenser 42. Condensate from condenser 42 may, in turn, be directed into HRSG 12 with the aid of a feedwater pump 44 through a line 46. Feedwater pump 44 is controlled by feedwater pump controller 45. The condensate flowing through economizer 32 is heated, but remains a liquid, and then is fed to boiler drum 34. The condensate may also be passed through a deaerator (not shown) before flowing into economizer 32 for removal of air and other dissolved gases. The water accumulated in boiler drum 34 is then passed through evaporator 30 for converting into saturated steam, and then through superheater 28. Superheater 28 converts the saturated steam into superheated steam. In one embodiment, HRSG system 12 may include a low pressure stage, an intermediate pressure stage and a high pressure stage, as is known in the art.

In order to maintain desired operation of boiler drum 34, HRSG system 12 includes a boiler drum water level control system (or, steam drum level control system) 50 that controls the water level of boiler drum 34 by supplying water into the boiler drum 34 or blowing down water based on a comparison between a desired drum water level in boiler drum 34 and an actual water level of boiler drum 34, e.g., during start-up operation or other operation of HRSG system 12. In one embodiment, boiler drum 34 includes blowdown valve 48 for controlling boiler swell during start-up operation of HRSG system 12. HRSG system 12 also includes a sensor system 52 having multiple sensors 52a for measuring a plurality of parameters about system 10, including, e.g., the metal temperature of boiler drum 34, the temperature of water in boiler drum 34, a vapor pressure within boiler drum 34, an actual water level in boiler drum 34, a load on gas turbine 18, a position of a steam bypass valve 54 (e.g., leading to a bypass region, not shown), or a steam flow rate in boiler drum 34. Steam drum level control system 50 can determine a desired water level for drum 34 during operation of system 10, based upon measured parameters and a predetermined model of system 10.

Figure 3:
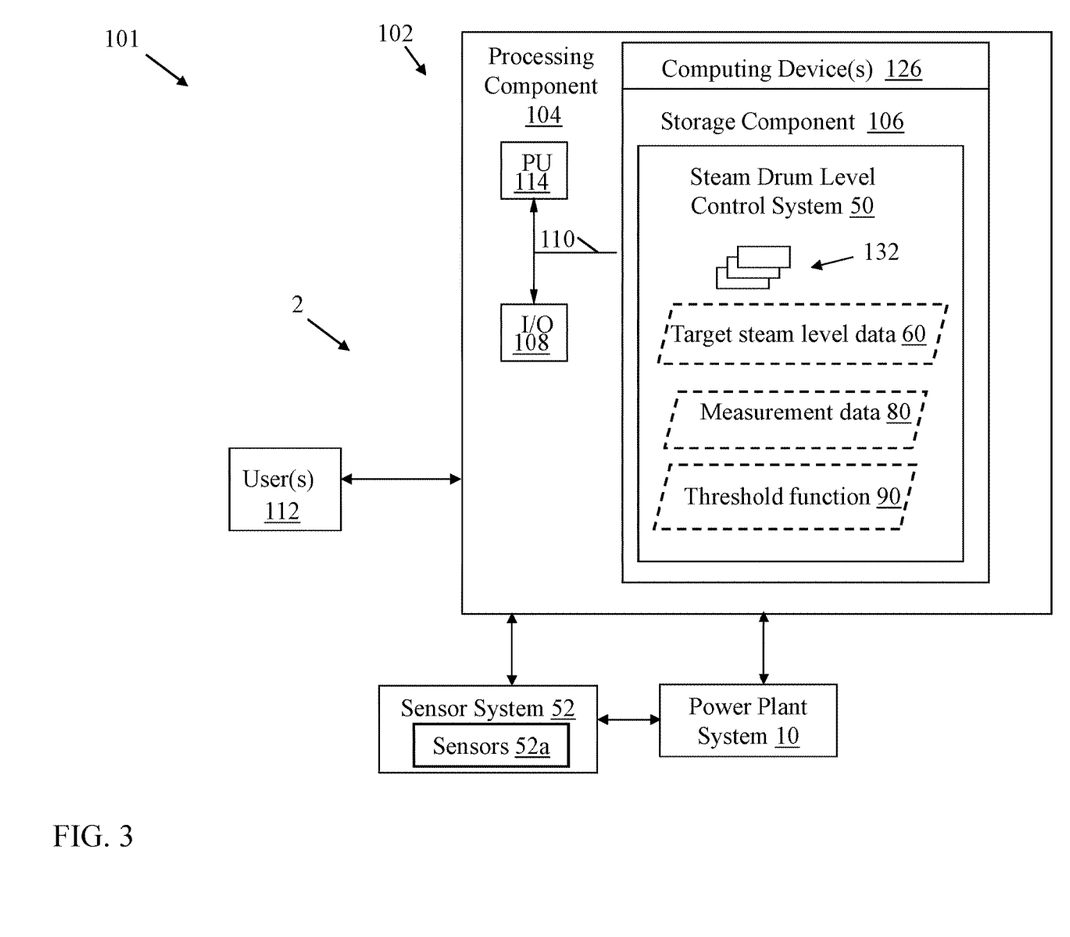
FIG. 3 shows an environment including a system for controlling the power plant system of FIG. 1, according to various embodiments of the disclosure.

As shown in FIG. 1 and FIG. 3, system 2 can include at least one computing device 126 configured to control power plant system 10. Computing device(s) 126 can be hard-wired and/or wirelessly connected to power plant system 10 via any conventional means. In various embodiments, computing device(s) 126 can include a control system, as described herein, for controlling operations of power plant system 10.

Figure 2:
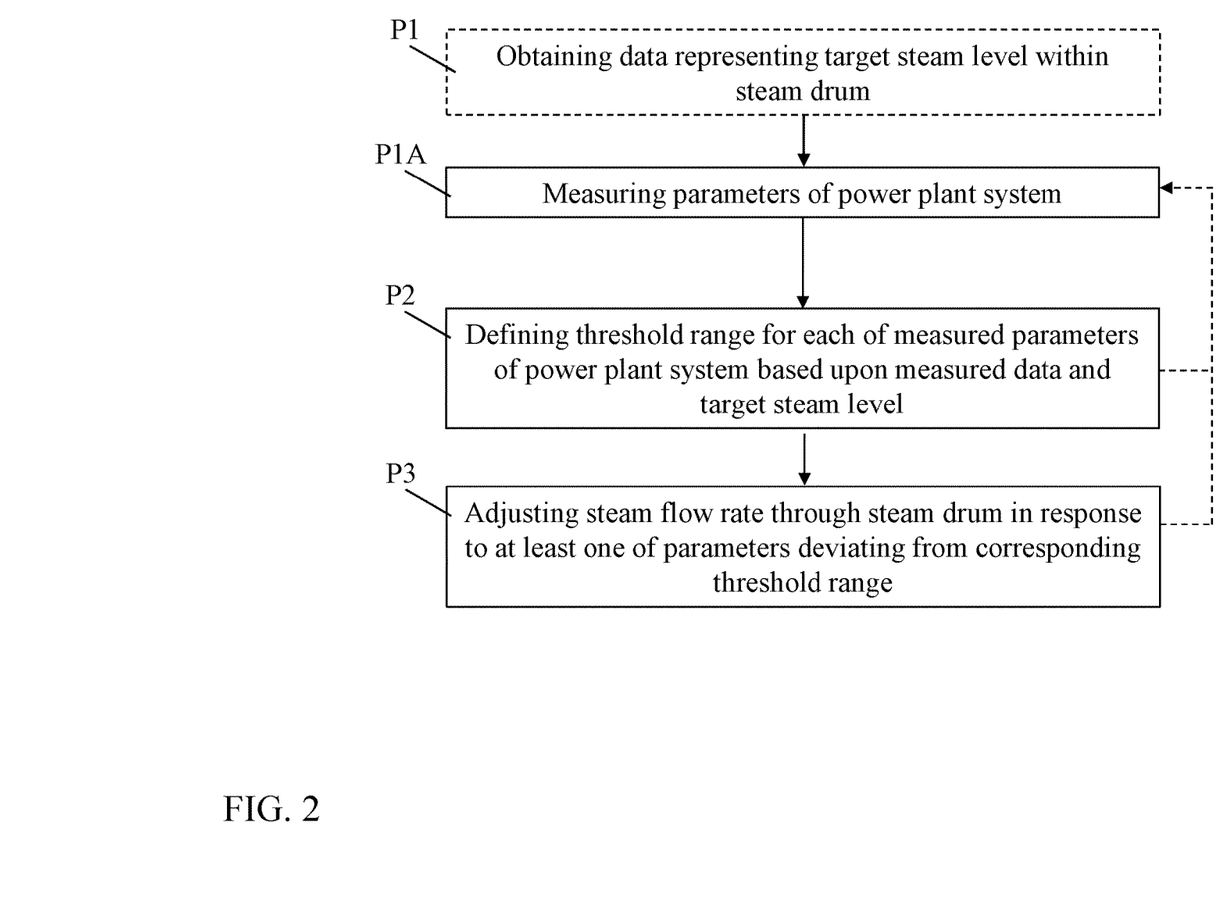
FIG. 2 shows a flow diagram illustrating a method performed according to particular embodiments of the disclosure.

FIG. 2 shows a flow diagram illustrating processes performed according to various embodiments of the disclosure. These processes can be performed, e.g., by at least one computing device 126 including steam drum level control system 50, as described herein. In other cases, these processes can be performed according to a computer-implemented method of controlling system 10. In still other embodiments, these processes can be performed by executing computer program code computing device(s) 126 to control operation of system 10. Continuing reference is made to FIG. 1 to illustrate these processes as they relate to system 10. Additional reference is made to environment 101, shown in FIG. 3 and described further herein. As shown in FIG. 2, processes according to embodiments can include the following sub-processes:

Process P1 (optional pre-process, indicated in phantom): obtaining data (target steam level data 60, FIG. 3) representing a target steam level within steam drum (drum) 34, at steam drum level control system 28. This process can include gathering or otherwise receiving target steam level data 60, which indicates a desired level of steam within steam drum 34. Target steam level data 60 can be provided by a product specification, e.g., tied to a particular type (e.g., make, model) of steam drum 34, or can be part of a test model derived for steam drum 34.

Process NA (performed as initial process according to various embodiments): measuring (measurement data 80): a steam pressure within steam drum 34, a load on GT 18, a position of bypass valve 54 (e.g., open, shut, partially open) bypassing HRSG 12, and a steam flow rate through steam drum 34. As described further herein, system 10 can further include a sensor system 52 coupled with steam drum level control system 50. Sensor system 52 can include a plurality of sensors 52a for measuring a plurality of parameters within system 10. For example, a pressure sensor 52a can measure an actual pressure within steam drum 34, while a flow sensor (e.g., flow meter) 52a can measure an actual steam flow rate through steam drum 34. It is understood that sensor system 52 and steam drum level control system 50 can be coupled via any conventional wireless and/or hard-wired means, and that similar means (or other conventional means) can be used to couple sensor system 52 with individual sensors 52a. Individual sensors 52a are shown as wirelessly connected in FIG. 1 for clarity of illustration.

Process P2: defining a threshold range (threshold function 90) for each of a steam pressure within steam drum 34, a load on GT 18, a position of bypass valve 54 bypassing the HRSG 12, and a steam flow rate through steam drum 34, based upon measurement data 80 and a target steam level (target steam level data 60). According to various embodiments, this can include defining a threshold range (e.g., upper and lower bound) for each measured parameter (e.g., steam pressure within steam drum 34, the load on GT 18, the position of bypass valve 54 bypassing the HRSG 12, and the steam flow rate through steam drum 34), along with a subset of that range indicating that one or more parameters is approaching the threshold. In various embodiment, this process can include defining a function including the four measured parameters which combines ranges to anticipate changes in conditions within steam drum 34 which may cause the steam level to deviate from the target steam level. In some cases, at least one threshold range includes an upper or a lower bound defined by a simulated variation on the measurement data 80, e.g., a statistical variation model based upon measurement data 80. In some cases, these upper and lower bounds can be defined by various operating points, and may be generated through Monte Carlo simulations. In these cases, the variation model defining the bounds can be built by a data distribution, including, e.g., Gaussian, Poisson, Weibull or other distribution(s). This model can be constructed as a weighted combination of parameters in order to generate a level set-point and upper/lower bounds accounting for a variety of variations. In some cases, the model can be generally constructed according to the following equation:

Level set point=F(W1×Steam Pressure, W2×Position Of Bypass Valve, W3×Bypassing HRSG, W4×Steam Flow Rate), where F can be any form of function that defines the relationship between parameters and drum level (e.g., neural network, fuzzy logic, optimizer, regression, logistic regression, etc.).

Process P3: adjusting the steam flow rate through steam drum 34 in response to at least one of the steam pressure within steam drum 34, the load on GT 18, the position of bypass valve 54 bypassing HRSG 12 or the steam flow rate through steam drum 34 deviating from the corresponding threshold range. In various embodiments, this process can include instructing feedwater pump controller 45 to modify a flow rate of feedwater to the steam drum 34 based upon the deviation of the parameter(s) from a corresponding threshold. In various embodiments, this process can include, in addition to, or alternatively to, control of feedwater pump controller 45, modifying the position of blowdown valve 48 to adjust the portion (e.g., amount, flow rate) of steam leaving HRSG 12 through blowdown valve 48. It is understood that blowdown valve 48, along with other valves described herein, can be operable connected (e.g., wirelessly or via hard-wired means) with steam drum level control system 50.

It is understood that processes P1A-P3 (and in some cases, P1), can be iterated on a periodic, or constant basis. Further, processes P1A-P3 (and in some cases, P1) can be performed in response to particular operating conditions of the system 10, for example, when a startup operation is initiated (e.g., control instructions for startup are obtained), or when a ramp-up is initiated (e.g., control instructions for increased output are obtained). Additionally, these processes can be repeated according to any schedule to control operation of system 10 as described herein.

It is understood that in the flow diagrams shown and described herein, other processes may be performed while not being shown, and the order of processes can be rearranged according to various embodiments. Additionally, intermediate processes may be performed between one or more described processes. The flow of processes shown and described herein is not to be construed as limiting of the various embodiments.

FIG. 3 shows an illustrative environment 101 including steam drum level control system 50, for performing the functions described herein according to various embodiments of the invention. To this extent, the environment 101 includes a computer system 102 that can perform one or more processes described herein in order to monitor and/or control system 10 (FIG. 1). In particular, the computer system 102 is shown as including the steam drum level control system 50, which makes computer system 102 operable to control/monitor operation of a system 10 by performing any/all of the processes described herein and implementing any/all of the embodiments described herein.

The computer system 102 is shown including a computing device 126, which can include a processing component 104 (e.g., one or more processors), a storage component 106 (e.g., a storage hierarchy), an input/output (I/O) component 108 (e.g., one or more I/O interfaces and/or devices), and a communications pathway 110. In general, the processing component 104 executes program code, such as the steam drum level control system 50, which is at least partially fixed in the storage component 106. While executing program code, the processing component 104 can process data, which can result in reading and/or writing transformed data from/to the storage component 106 and/or the I/O component 108 for further processing. The pathway 110 provides a communications link between each of the components in the computer system 102. The I/O component 108 can comprise one or more human I/O devices, which enable a user (e.g., a human and/or computerized user) 112 to interact with the computer system 102 and/or one or more communications devices to enable the system user 112 to communicate with the computer system 102 using any type of communications link. To this extent, the steam drum level control system 50 can manage a set of interfaces (e.g., graphical user interface(s), application program interface, etc.) that enable human and/or system users 112 to interact with the steam drum level control system 50. Further, the steam drum level control system 50 can manage (e.g., store, retrieve, create, manipulate, organize, present, etc.) data, such as target steam level data 60, measurement data 80 and/or threshold function (data) 90 using any solution, e.g., via wireless and/or hardwired means.

In any event, the computer system 102 can comprise one or more general purpose computing articles of manufacture (e.g., computing devices) capable of executing program code, such as the steam drum level control system 50, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the steam drum level control system 50 can be embodied as any combination of system software and/or application software. It is further understood that the steam drum level control system 50 can be implemented in a cloud-based computing environment, where one or more processes are performed at distinct computing devices (e.g., a plurality of computing devices 126), where one or more of those distinct computing devices may contain only some of the components shown and described with respect to the computing device 126 of FIG. 3.

Further, steam drum level control system 50 can be implemented using a set of modules 132. In this case, a module 132 can enable the computer system 102 to perform a set of tasks used by the steam drum level control system 50, and can be separately developed and/or implemented apart from other portions of the steam drum level control system 50. As used herein, the term "component" means any configuration of hardware, with or without software, which implements the functionality described in conjunction therewith using any solution, while the term "module" means program code that enables the computer system 102 to implement the functionality described in conjunction therewith using any solution. When fixed in a storage component 106 of a computer system 102 that includes a processing component 104, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of the computer system 102.

When the computer system 102 comprises multiple computing devices, each computing device may have only a portion of steam drum level control system 50 fixed thereon (e.g., one or more modules 132). However, it is understood that the computer system 102 and steam drum level control system 50 are only representative of various possible equivalent computer systems that may perform a process described herein. To this extent, in other embodiments, the functionality provided by the computer system 102 and steam drum level control system 50 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 102 includes multiple computing devices 26, the computing devices can communicate over any type of communications link. Further, while performing a process described herein, the computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

While shown and described herein as a method and system for controlling operation of a system 10 (FIG. 1), it is understood that aspects of the invention further provide various alternative embodiments. For example, in one embodiment, the invention provides a computer program fixed in at least one computer-readable medium, which when executed, enables a computer system to controlling operation of system 10. To this extent, the computer-readable medium includes program code, such as the steam drum level control system 50 (FIG. 3), which implements some or all of the processes and/or embodiments described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; etc.

In another embodiment, the invention provides a method of providing a copy of program code, such as the steam drum level control system 50 (FIG. 3), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of controlling operation of a system 10 (FIG. 1). In this case, a computer system, such as the computer system 102 (FIG. 3), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; etc.

In any case, the technical effect of the various embodiments of the disclosure, including, e.g., steam drum level control system 50, is to control operation of a power plant system. It is understood that according to various embodiments, steam drum level control system 50 could be implemented to control operation of a plurality of power plant systems, such as system 10 described herein.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:
1. A system comprising:
at least one computing device configured to control a power plant system including a steam turbine (ST), a gas turbine (GT), and a heat recovery steam generator (HRSG) having a steam drum fluidly connected with the ST and the GT, by performing actions including:
measuring: a steam pressure within the steam drum, a load on the GT, a position of a bypass valve bypassing the HRSG, and a steam flow rate through the steam drum;
defining a threshold range for each of: a steam pressure within the steam drum, a load on the GT, a position of the bypass valve bypassing the HRSG and a steam flow rate through the steam drum based upon the measured data and a target steam level; and
adjusting a drum level setpoint of the steam drum in response to at least one of the steam pressure within the steam drum, the load on the GT, the position of the bypass valve bypassing the HRSG or the steam flow rate through the steam drum deviating from the threshold range,
wherein the drum level setpoint accounts for a minimum water inventory required in the steam drum to prevent a low-level trip event, and wherein the drum level setpoint is defined by the following equation:
Level set point =F(W1 ×Steam Pressure, W2 ×Load on GT, W3 ×Position Of Bypass Valve, W4 ×Steam Flow Rate), where F includes a form or function defining the relationship between each of the measured steam pressure within the steam drum, load on the GT, position of the bypass valve bypassing the HRSG, and steam flow rate through the steam drum, and the target steam level.

2. The system of claim 1, further comprising a sensor system coupled with the power plant system, wherein the sensor system is configured to measure the data indicating the steam pressure within the steam drum, the load on the GT, the position of the bypass valve bypassing the HRSG and the steam flow rate through the steam drum.

3. The system of claim 1, further comprising a feedwater pump connected with the steam drum, and a feedwater pump controller coupled with the feedwater pump.

4. The system of claim 3, wherein the adjusting of the flow rate includes instructing the feedwater controller to modify a flow rate of feedwater to the steam drum.

5. The system of claim 1, wherein the target steam level is based upon a predefined model of the steam drum.

6. A system comprising:
a steam turbine (ST);
a gas turbine (GT);
a heat recovery steam generator (HRSG) having a steam drum and being fluidly connected with the ST and the GT; and
a control system coupled with the ST, the GT and the HRSG, the control system configured to control a flow of steam through the steam drum by performing actions including:
measuring: a steam pressure within the steam drum, a load on the GT, a position of a bypass valve bypassing the HRSG, and a steam flow rate through the steam drum;
defining a threshold range for each of: a steam pressure within the steam drum, a load on the GT, a position of the bypass valve bypassing the HRSG and a steam flow rate through the steam drum based upon the measured data and a target steam level; and
adjusting a drum level setpoint of the steam drum in response to at least one of the steam pressure within the steam drum, the load on the GT, the position of the bypass valve bypassing the HRSG or the steam flow rate through the steam drum deviating from the corresponding threshold range,
wherein the drum level setpoint accounts for a minimum water inventory required in the steam drum to prevent a low-level trip event, and wherein the drum level setpoint is defined by the following equation:
Level set point =F(W1 ×Steam Pressure, W2 ×Load on GT, W3 ×Position Of Bypass Valve, W4 ×Steam Flow Rate), where F includes a form or function defining the relationship between each of the measured steam pressure within the steam drum, load on the GT, position of the bypass valve bypassing the HRSG, and steam flow rate through the steam drum, and the target steam level.

7. The system of claim 6, further comprising a sensor system coupled with the GT, the ST and the HRSG, wherein the sensor system is configured to measure the data indicating the steam pressure within the steam drum, the load on the GT, the position of the bypass valve bypassing the HRSG and the steam flow rate through the steam drum.

8. The system of claim 6, further comprising a feedwater pump connected with the steam drum, and a feedwater pump controller coupled with the feedwater pump.

9. The system of claim 8, wherein the adjusting of the flow rate includes instructing the feedwater controller to modify a flow rate of feedwater to the steam drum.

10. The system of claim 6, wherein the target steam level is based upon a predefined model of the steam drum.

11. A computer program product comprising program code stored on a non-transitory computer-readable medium, which when executed by at least one computing device, causes the at least one computing device to control a power plant system including a steam turbine (ST), a gas turbine (GT), and a heat recovery steam generator (HRSG) having a steam drum fluidly connected with the ST and the GT, by performing actions including:
measuring: a steam pressure within the steam drum, a load on the GT, a position of a bypass valve bypassing the HRSG, and a steam flow rate through the steam drum;
defining a threshold range for each of: a steam pressure within the steam drum, a load on the GT, a position of the bypass valve bypassing the HRSG and a steam flow rate through the steam drum based upon the measured data and a target steam level; and
adjusting a drum level setpoint of the steam drum in response to at least one of the steam pressure within the steam drum, the load on the GT, the position of the bypass valve bypassing the HRSG or the steam flow rate through the steam drum deviating from the corresponding threshold range,
wherein the drum level setpoint is defined by the following equation:
Level set point =F(W1 ×Steam Pressure, W2 ×Load on GT, W3 ×Position Of Bypass Valve, W4 ×Steam Flow Rate), where F includes a form or function defining the relationship between each of the measured steam pressure within the steam drum, load on the GT, position of the bypass valve bypassing the HRSG, and steam flow rate through the steam drum, and the target steam level.

12. The computer program product of claim 11, wherein the power plant system includes a sensor system coupled with the GT, the ST and the HRSG, wherein the sensor system is configured to measure the data indicating the steam pressure within the steam drum, the load on the GT, the position of the bypass valve bypassing the HRSG and the steam flow rate through the steam drum.

13. The computer program product of claim 11, wherein the steam drum is connected with a feedwater pump, and the feedwater pump is connected with a feedwater pump controller, wherein the adjusting of the flow rate includes instructing the feedwater pump controller to modify a flow rate of feedwater to the steam drum.

14. The computer program product of claim 11, wherein at least one threshold range includes an upper or a lower bound defined by a simulated variation on the measured data.

15. The computer program product of claim 11, wherein the target steam level data is based upon a predefined model of the steam drum.

* * * * *